United States Patent
Li et al.

(10) Patent No.: US 10,461,590 B2
(45) Date of Patent: Oct. 29, 2019

(54) SINGLE PHASE PERMANENT MAGNET MOTOR

(71) Applicant: Johnson Electric S.A., Murten (CH)

(72) Inventors: Yue Li, Hong Kong (CN); Jie Chai, Shenzhen (CN); Chui You Zhou, Shenzhen (CN); Tao Zhang, Shenzhen (CN); Yong Wang, Shenzhen (CN); Yong Li, Shenzhen (CN)

(73) Assignee: Johnson Electric International AG, Murten (CH)

( * ) Notice: Subject to any disclaimer, the term of this patent is extended or adjusted under 35 U.S.C. 154(b) by 203 days.

(21) Appl. No.: 15/249,887

(22) Filed: Aug. 29, 2016

(65) Prior Publication Data

US 2017/0063180 A1 Mar. 2, 2017

(30) Foreign Application Priority Data

Aug. 28, 2015 (CN) .......................... 2015 1 0543842
May 30, 2016 (CN) .......................... 2016 1 0370452

(51) Int. Cl.
H02K 29/03 (2006.01)
H02K 1/14 (2006.01)
H02K 19/04 (2006.01)
H02K 1/27 (2006.01)

(52) U.S. Cl.
CPC ............ H02K 1/148 (2013.01); H02K 1/146 (2013.01); H02K 1/278 (2013.01); H02K 19/04 (2013.01); H02K 29/03 (2013.01); H02K 2213/03 (2013.01)

(58) Field of Classification Search
CPC ...... H02K 1/148; H02K 1/2706; H02K 29/03; H02K 1/278; H02K 2213/03; H02K 19/04; H02K 1/146; H02K 21/16; H02K 7/14

USPC ..... 310/216.001, 216.091, 216.093, 216.064
See application file for complete search history.

(56) References Cited

U.S. PATENT DOCUMENTS

| | | | | |
|---|---|---|---|---|
| 5,250,867 A | * | 10/1993 | Gizaw | ................... H02K 21/16 310/156.12 |
| 6,087,752 A | * | 7/2000 | Kim | ..................... H02K 1/2766 310/156.56 |
| 6,858,960 B1 | * | 2/2005 | Muszynski | ............ H02K 29/03 310/156.38 |
| 2002/0047335 A1 | * | 4/2002 | Matsuzawa | ............ G04C 10/00 310/49.26 |

(Continued)

FOREIGN PATENT DOCUMENTS

| | | |
|---|---|---|
| CN | 1396692 A | 2/2003 |
| CN | 101232267 B | 7/2008 |
| CN | 104348268 A | 2/2015 |

Primary Examiner — Julio C. Gonzalez
Assistant Examiner — Alexander A Singh
(74) Attorney, Agent, or Firm — Muncy, Geissler, Olds & Lowe, P.C.

(57) ABSTRACT

A single phase permanent magnet motor includes a stator. The stator includes a stator core and windings. The stator core includes a ring portion, tooth bodies extending radially from the ring portion, and a pole shoe extending from a distal end to two circumferential sides of each tooth body. Each pole shoe defines a positioning slot. A center of each positioning slot is offset from a center of symmetry of one adjacent tooth body so that a torque fluctuation of an output torque of the single phase permanent magnet motor during operation is less than 50%. As a result, the motor vibration and noise are small.

19 Claims, 13 Drawing Sheets

(56) References Cited

U.S. PATENT DOCUMENTS

| | | | | |
|---|---|---|---|---|
| 2002/0067092 A1* | 6/2002 | Crapo | ................... | H02K 1/278 310/156.47 |
| 2008/0197794 A1* | 8/2008 | Vermeir | ................. | H02P 6/085 318/400.06 |
| 2014/0252904 A1* | 9/2014 | Mikami | ................. | H02K 1/243 310/156.66 |

* cited by examiner

SINGLE PHASE PERMANENT MAGNET MOTOR

CROSS REFERENCE TO RELATED APPLICATIONS

This non-provisional patent application claims priority under 35 U.S.C. § 119(a) from Patent Application No. 201510543842.6 filed in The People's Republic of China on Aug. 28, 2015, and Patent Application No. 201610370452.8 filed in The People's Republic of China on May 30, 2016.

FIELD OF THE INVENTION

The present invention relates to a single phase permanent magnet motor, and in particular to a single phase permanent magnet motor having a slot.

BACKGROUND OF THE INVENTION

Referring to FIG. 13 and FIG. 14, the upper diagram of FIG. 13 shows the electromagnetic torque (which is direct proportional to back-EMF) of an existing single phase permanent magnet motor during one electric period, where the horizontal axis represents time, the vertical axis represents the amplitude of electromagnetic torque. The lower diagram of FIG. 13 is a curve diagram showing the changing of the cogging torque of the existing single phase permanent magnet motor during one electric period, where the horizontal axis represents time, and the vertical axis represents cogging torque. FIG. 14 illustrates the motor output torque that is synthesized from the electromagnetic torque and the cogging torque of FIG. 13. Because the torque fluctuation rate=(maximal torque−minimum torque)/mean torque, as can be seen from FIG. 14, the fluctuation rate of the output torque of the existing single phase permanent magnet motor=(47−0)/20=235%. In other existing motors, the fluctuation rate of the output torque of the single phase motors is at least greater than 100%. As a result, the existing single phase motor during operation generates a large torque fluctuation, which causes obvious motor vibration and large noise.

SUMMARY OF THE INVENTION

Accordingly, there is a desire for a single phase permanent magnet motor with reduced vibration and noise.

A single phase permanent magnet motor comprises a stator. The stator includes a stator core and windings wound around the stator core. The stator core comprises a ring portion, a plurality of tooth bodies extending radially from the ring portion, and a pole shoe extending from a distal end to two circumferential sides of each tooth body. Each pole shoe defines a positioning slot. A center of each positioning slot is offset from a center of symmetry of one adjacent tooth body so that a torque fluctuation of an output torque of the single phase permanent magnet motor during operation is less than 50%.

Preferably, the single phase permanent magnet motor further comprises a rotor rotatable relative to the stator, the rotor includes a plurality of permanent magnetic poles arranged along a circumferential direction of the rotor.

Preferably, the tooth bodies extend inwardly from the ring portion, the pole shoes respectively extend from inner ends of the tooth bodies, the rotor is received in a space bounded by the pole shoes, and the windings are wound around the tooth bodies.

Preferably, the positioning slot is defined in an inner circumferential surface of the pole shoe.

Preferably, the center of each positioning slot is offset from the center of symmetry of one adjacent tooth body by 40 to 50 degrees electric angle.

Preferably, the center of each positioning slot is offset from the center of symmetry of one adjacent tooth body by 45 degrees electric angle, and the output torque of the single phase permanent magnet motor has a fluctuation rate of less than 35%.

Preferably, an outer surface of each permanent magnetic pole is spaced from a central axis of the rotor by a distance progressively decreasing from a circumferential center to two circumferential ends of the outer surface, such that the outer surface of the permanent magnetic pole and an inner circumferential surface of the pole shoe define a symmetrical uneven air gap therebetween that is symmetrical about a center line of the permanent magnetic pole.

Preferably, each permanent magnetic pole is formed by one or more permanent magnet members, or all permanent magnetic poles are formed by a single ring shaped magnetic member.

Preferably, the rotor comprises a rotor core, each permanent magnetic member is mounted to an outer circumferential surface of the rotor core.

Preferably, the outer circumferential surface of the rotor core defines a plurality of axially extending grooves, and each groove is located at a junction between two adjacent permanent magnetic poles.

Preferably, each permanent magnetic pole has a uniform thickness, and the outer circumferential surface of the rotor core matches with the permanent magnet pole in shape, the outer surface of the permanent magnetic pole and an inner circumferential surface of the pole shoe define a symmetrical uneven air gap or an even air gap therebetween.

Preferably, the outer circumferential surface of the rotor core and an inner circumferential surface of the permanent magnet member are located on a same cylindrical surface, and the permanent magnet member has a thickness progressively decreasing from a circumferential center to two circumferential ends of the permanent magnet member.

Preferably, the symmetrical uneven air gap has a maximum thickness that is at least 1.5 times of a minimum thickness of the symmetrical uneven air gap.

Preferably, a slot is defined between each two adjacent pole shoes, and a width of the slot is greater than zero and less than or equal to four times of a minimum thickness of the symmetrical uneven air gap.

Preferably, the width of the slot is greater than zero and less than or equal to two times of the minimum thickness of the symmetrical uneven air gap.

Preferably, a radial thickness of the pole shoe progressively decreases in a direction away from the tooth body.

Preferably, the positioning slot is defined between an outer circumferential surface and an inner circumferential surface of the pole shoe.

Preferably, the positioning slot is formed in an inner circumferential surface of the pole shoe.

A single phase permanent magnet motor comprises a stator and a rotor rotatable relative to the stator. The stator comprises a stator core and windings wound around the stator core. The stator core comprises a ring portion, a plurality of tooth bodies extending radially from the ring portion, and a pole shoe extending from a distal end to two circumferential sides of each tooth body. The rotor comprises a plurality of permanent magnetic poles arranged along a circumferential direction of the rotor. Each pole shoe defines a positioning slot. A center of each positioning slot is offset from a center of symmetry of one adjacent tooth body by 40 to 50 degrees electric angle.

Preferably, the tooth bodies extend inwardly from the ring portion, the pole shoes respectively extend from inner ends of the tooth bodies, the rotor is received in a space bounded by the pole shoes.

Preferably, the center of each positioning slot is offset from the center of symmetry of one adjacent tooth body by 45 degrees electric angle, and the output torque of the single phase permanent magnet motor has a fluctuation rate of less than 35%.

In the single phase permanent magnet motor, each pole shoe forms a positioning slot, and a center of each positioning slot is offset from a center of symmetry of one adjacent tooth body so that a torque fluctuation of an output torque of the single phase permanent magnet motor during operation is less than 50%. As a result, the motor vibration and noise are small.

DETAILED DESCRIPTION OF THE PREFERRED EMBODIMENTS

Figure 1:
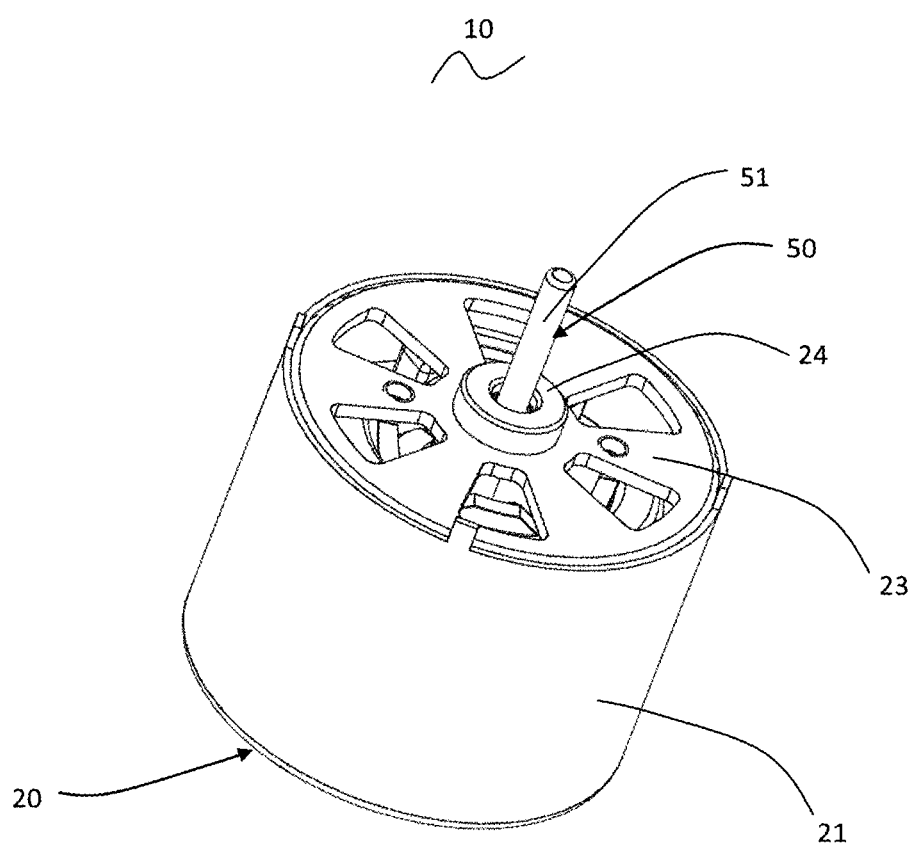
FIG. 1 illustrates a single phase permanent magnet motor according to a first embodiment of the present invention.
Figure 2:
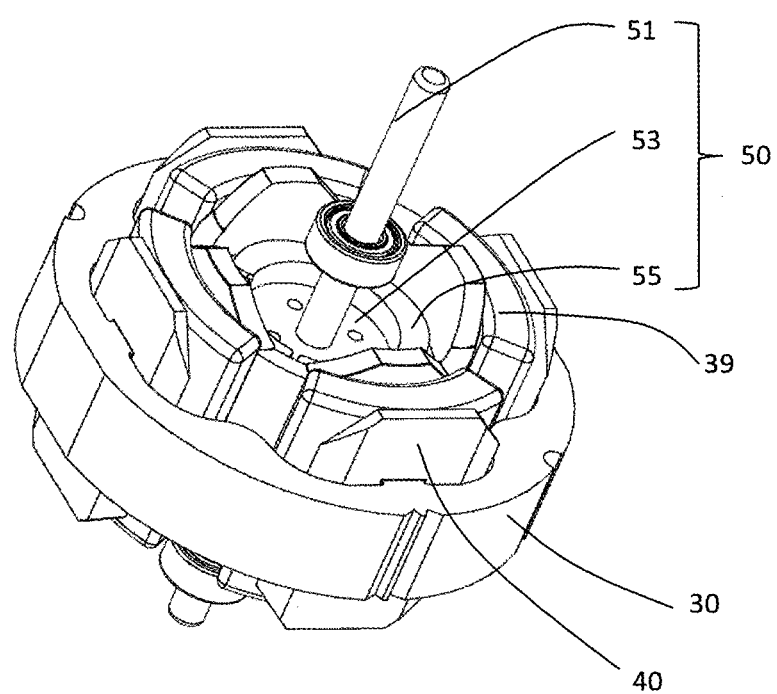
FIG. 2 illustrates the single phase permanent magnet motor of FIG. 1, with an outer housing being removed.
Figure 3:
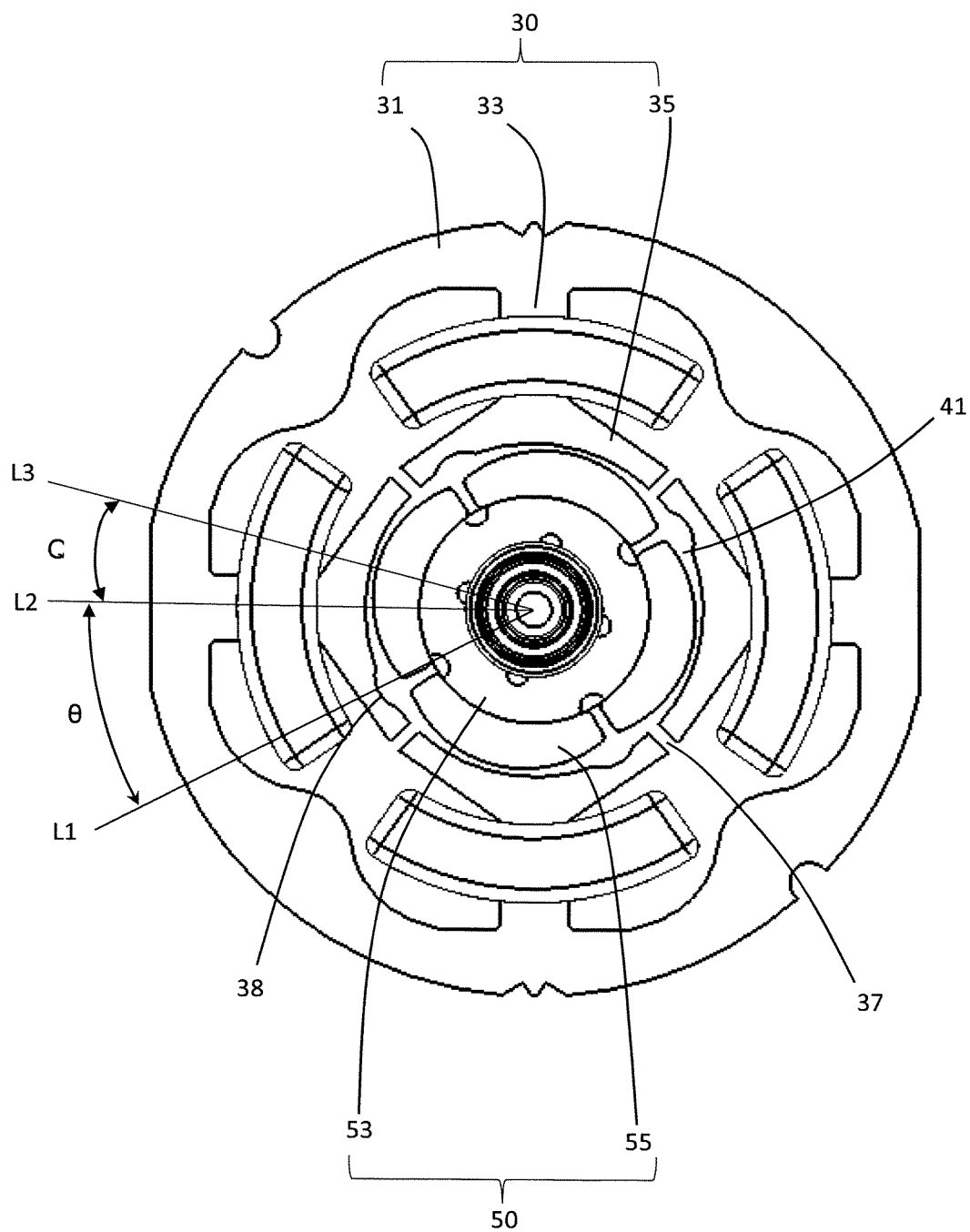
FIG. 3 is an end view of the single phase permanent magnet motor of FIG. 2 along an axial direction of the motor.
Figure 4:
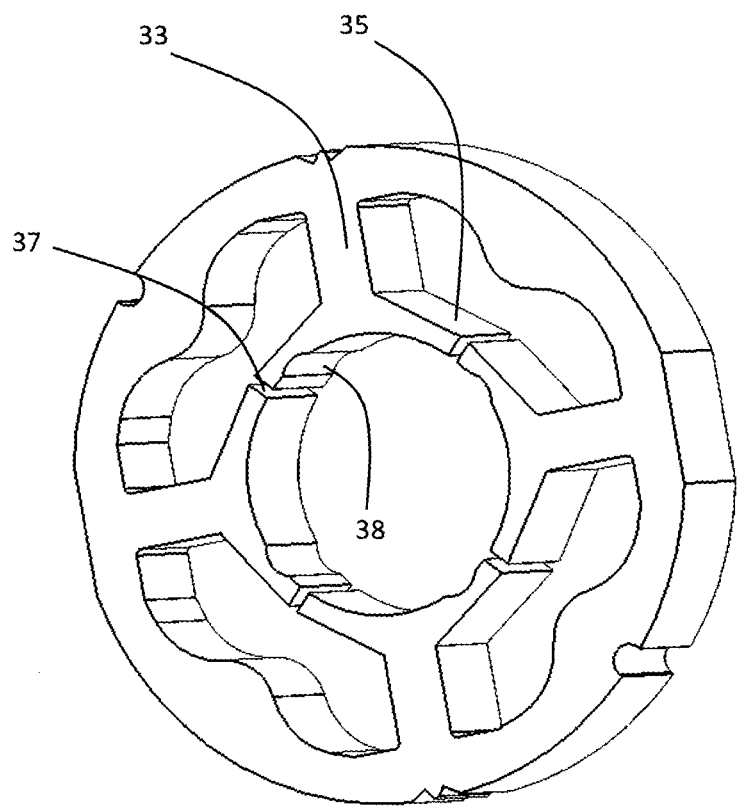
FIG. 4 illustrates a stator core of the single phase permanent magnet motor of FIG. 2.
Figure 5:
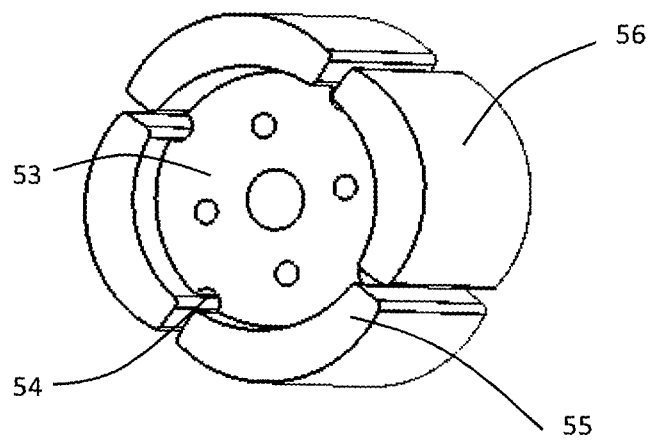
FIG. 5 illustrates a rotor core and permanent magnets of the single phase permanent magnet motor of FIG. 2.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

First Embodiment

Referring to FIG. 1 to FIG. 5, the single phase permanent magnet motor 10 in accordance with a preferred embodiment of the present invention includes a stator 20 and a rotor 50 rotatable relative to the stator. The stator 20 includes a cylindrical outer housing 21 with one open end, an end cap 23 mounted to the open end of the outer housing 21, a stator core 30 mounted in the outer housing 21, an insulating bracket 40 mounted to the stator core 30, and windings 39 wound around the stator core 30 and supported by the insulating bracket 40. The stator core 30 includes an outer ring portion 31, a plurality of tooth bodies 33 extending inwardly from the outer ring portion 31, a pole shoe 35 extending from a radial distal end to two circumferential sides of each tooth body 33. The windings 39 are wound around the pole shoes 33, and are isolated from the stator core 30 by the insulating bracket 40. The term "ring portion" used in this disclosure refers to a closed structure formed by extending continuously along a circumferential direction, such as circular ring, square ring, polygon ring or the like.

The rotor 50 is received in a space cooperatively defined by the pole shoes 35. The rotor 50 includes a plurality of permanent magnetic poles 55 disposed along a circumferential direction of the rotor 50. An outer surface of each permanent magnetic pole 55 is an arc surface. The outer surface of each permanent magnetic pole 55 is spaced from a central axis of the rotor 50 by a distance progressively decreasing from a circumferential center to two circumferential sides of the outer surface. The outer surface of the permanent magnetic pole 55 and an inner circumferential surface of a corresponding one of the pole shoes 35 define an uneven air gap 41 therebetween that is symmetrical about a center line of the permanent magnetic pole 55. Preferably, the symmetrical uneven air gap 41 has a maximum thickness that is at least 1.5 times of a minimum thickness of the symmetrical uneven air gap 41. The term "thickness" of the symmetrical uneven air gap 41 refers to a radial thickness of the air gap.

In this embodiment, each permanent magnetic pole 55 is formed by a single permanent magnet member 56. The rotor 50 further includes a rotor core 53. The permanent magnet member 56 is mounted to an outer circumferential surface of the rotor core 53. The outer circumferential surface of the rotor core 53 is provided with a plurality of axially extending grooves 54. Each groove 54 is located at a junction between two adjacent permanent magnetic poles 55 to reduce magnetic leakage. In order to form the uneven air gap 41 between the permanent magnetic pole 55 and the inner circumferential surface of the pole shoe, specifically, the outer circumferential surface of the rotor core 53 and the inner circumferential surface of the pole shoe 35 are located on two concentric circles in an axial plan view, and a thickness of each permanent magnet member 56 progressively decreases from a circumferential center to two circumferential ends of the permanent magnet member 56.

The rotor 50 further includes a rotary shaft 51 passing through and fixed to the rotor core 53. One end of the rotary shaft 51 is mounted to the end cap 23 through a bearing 24, and the other end is mounted to a bottom of the cylindrical outer housing 21 of the stator 20 through another bearing, such that the rotor 50 is capable of rotation relative to the stator 20.

The stator core 30 is made from a magnetic-conductive magnetic material. For example, the stator core 30 is formed by stacking magnetic laminations (silicon steel laminations commonly used in the industry) along an axial direction of the motor 10. In the stator core 30, a slot 37 is defined between each two adjacent pole shoes 35. Preferably, each slot 37 is located at a middle position between two adjacent tooth bodies 33. This design can reduce the induction potential of the motor, thus increasing the output torque of the motor. The slot 37 has a width greater than zero and less or equal to four times of a minimum thickness of the symmetrical uneven air gap 41. Preferably, the width of the slot 37 is greater than zero and less than or equal to two times of the minimum thickness of the symmetrical uneven air gap 41. As configured above, the motor startup and rotation is smooth, which can improve the motor startup reliability and reduces the possible dead points.

Preferably, a radial thickness of each pole shoe 35 progressively decreases in a direction from the tooth body 33 to the slots 37, such that the magnetic reluctance of the pole shoe 35 progressively increases in the direction from the tooth body 33 to the slots 37, thus forming a magnetic bridge with progressively increasing magnetic reluctance. This design can make the motor operation smoother and improve the reliability of the motor startup.

In this embodiment, the pole shoe 35 between each two adjacent tooth bodies 33 defines a positioning slot 38. The number of the positioning slots 38 is the same as the number of the poles of the stator 20 and the number of the ring-shaped permanent magnetic poles 55. In the present embodiment, the number of the positioning slots 38 is four. In the present embodiment, the stator winding is a concentrated winding and, therefore, the number of the tooth bodies 33 is the same as the number of the poles of the stator 20. In an alternative embodiment, the number of the tooth bodies can be an integer times of the number of the poles of the stator, such as, two times, three times or the like.

In this embodiment, the positioning slots 38 are spaced along the axial direction of the motor 10, and are disposed in the inner circumferential surfaces of the pole shoes 35. In an alternative embodiment, the positioning slots 38 extend continuously along the axial direction of the motor. Each positioning slot 38 is spaced from the two adjacent tooth bodies 33 by different distances. The positioning slot 38 is closer to one of the two adjacent tooth bodies 33. A center line L1 of the positioning slot 38 (i.e. a straight line passing through a center of the positioning slot 38 and a center of the rotor 50) is offset from a center line L2 of one adjacent tooth body 33 by an angle θ. When the angle θ between the center lines L1 and L2 is equal to 45 degrees electric angle, the output torque of the motor has an ideal torque fluctuation, and the motor vibration and noise are small. It has been found from a large number of experiments that, when the angle θ between the center lines L1 and L2 ranges between 40 degrees to 50 degrees electric angle, the output torque of the motor has an ideal torque fluctuation, and the motor vibration and noise are small.

In other embodiments, the slot 37 may be offset from the middle position between the two adjacent tooth bodies 33 and far away from the adjacent positioning slot 38.

When the motor 10 is not energized, i.e. at an initial position, a center line L3 of the magnetic pole of the rotor 50 is offset from the center line L2 of the tooth body 33 of the stator 20. An angle Q defined between the center line L3 and the center line L2 is referred to as a startup angle. In this embodiment, the startup angle is greater than 45 degrees electric angle and less than 135 degrees electric angle. When the windings 39 of the motor 10 is supplied with an electric current in one direction, the rotor 50 can be started along one direction. When the windings 39 of the motor 10 is supplied with an electric current in an opposite direction, the rotor 50 can be started along an opposite direction. It should be understood that, when the startup angle is equal to 90 degrees electric angle (i.e. a center of the rotor magnetic pole is aligned with the symmetry center of two adjacent tooth bodies 33), the rotor 50 can be easily started in both directions, i.e. it is the easiest angle to achieve bidirectional startup. When the startup angle is offset from 90 degrees electric angle, the rotor 50 is easier to start in one direction than in the opposite direction. It has been found from a large number of experiments that, when the startup angle is in the range of 45 degrees to 135 degrees electric angle, the startup of the rotor in both directions has good reliability.

Figure 6:
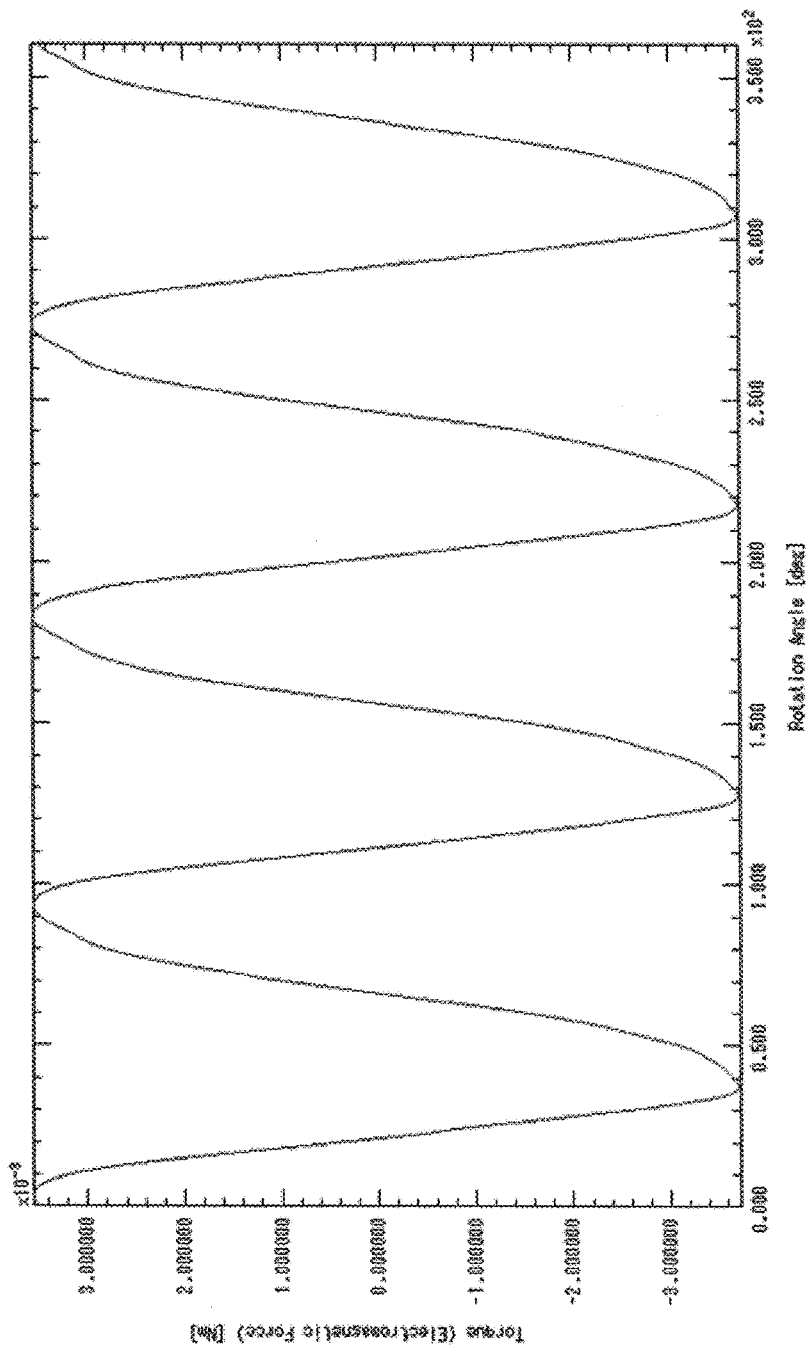
FIG. 6 shows a cogging torque curve of the single phase permanent magnet motor of the FIG. 1 during rotation.

FIG. 6 shows a torque curve of the single phase permanent magnet motor of the above embodiment during rotation, where the horizontal axis represents the rotation angle with the unit being degree, and the vertical axis represents the torque with the unit being Nm. As can be seen, during motor rotation, the motor torque curve is smooth, which reduces or avoids the startup dead point and hence improves the reliability of the motor startup.

Second Embodiment

Figure 7:
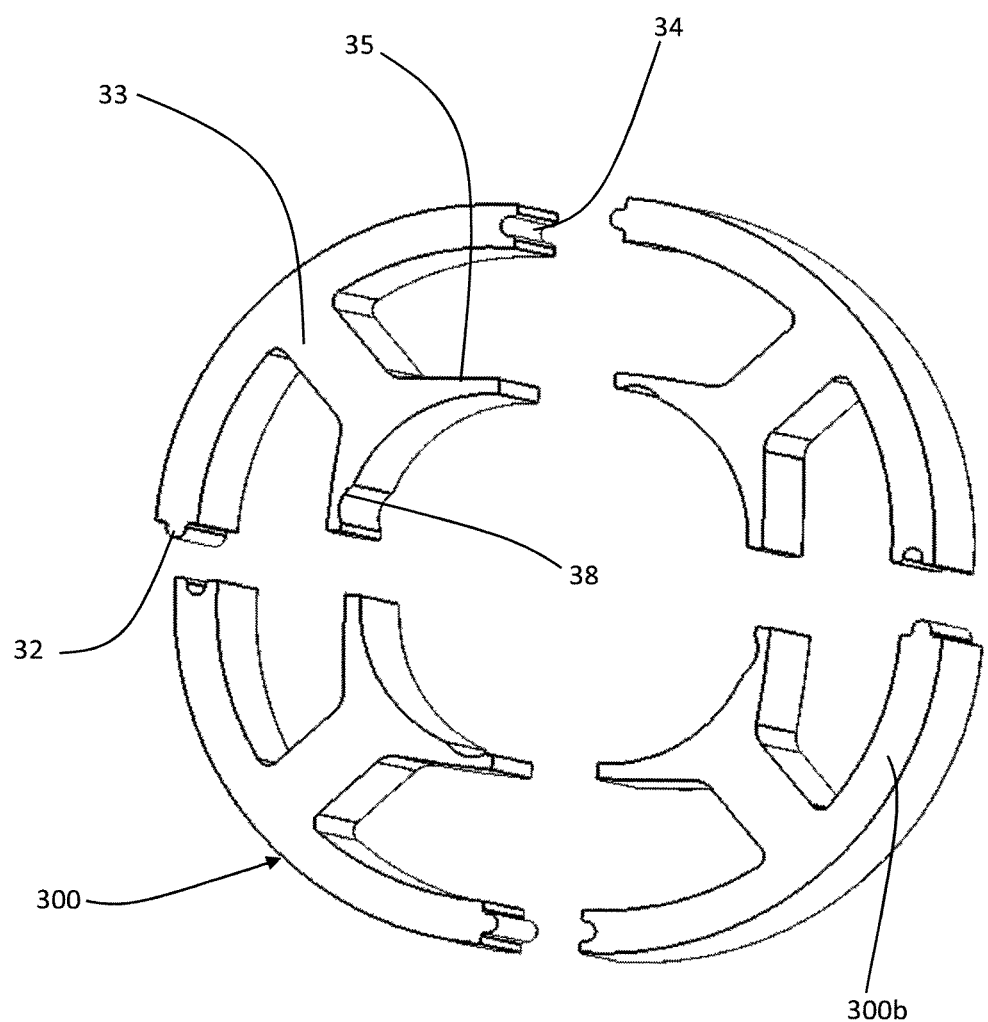
FIG. 7 illustrates a stator core of the single phase permanent magnet motor according to a second embodiment of the present invention.

Referring to FIG. 7, different from the first embodiment, in order to increase the winding efficiency of the stator winding 39, the stator core 30 includes a plurality of stator core parts 300 joined along a circumferential direction of the stator. Each stator core part 300 includes an arcuate yoke segment 300b, a tooth body 33 extending from the arcuate yoke segment 300b, and a pole shoe 35 extending from a radial distal end of the tooth body 33 to two circumferential sides of the tooth body 33. In this embodiment, each stator core part 300 includes a single tooth body 33 and one associated pole shoe 35. It should be understood that, each stator core part may also include more than one tooth body 33 and corresponding pole shoes 35. After the winding process of each stator core part is completed, the plurality of the stator core parts are joined to obtain the stator core 30 with windings.

A recess-protrusion engagement structure is formed on a joining area between the arcuate yoke segments 300b of two adjacent stator core parts 300. Specifically, in forming the recess-protrusion engagement structure, two ends of the arcuate yoke segment 300b of each stator core part 300 for being connected to form the outer ring portion may be provided with an engagement recess 34 and an engagement protrusion 32 engaged in the engagement recess 34, respectively. The engagement recess 34 and the engagement protrusion 32 together form the recess-protrusion engagement structure. In assembly, the engagement protrusion 32 of each stator core part 300 engages with the engagement recess 34 of one adjacent stator core part 300, and the engagement protrusion 34 of each stator core part 300 engages with the engagement protrusion 32 of an adjacent stator core part 300.

Because the stator core 30 is formed by joining multiple stator core parts 300, the slot 37 between two adjacent pole shoes 35 can have a very small width. In this disclosure, the width of the slot 37 refers to a distance between the two adjacent pole shoes 35.

Third Embodiment

Figure 8:
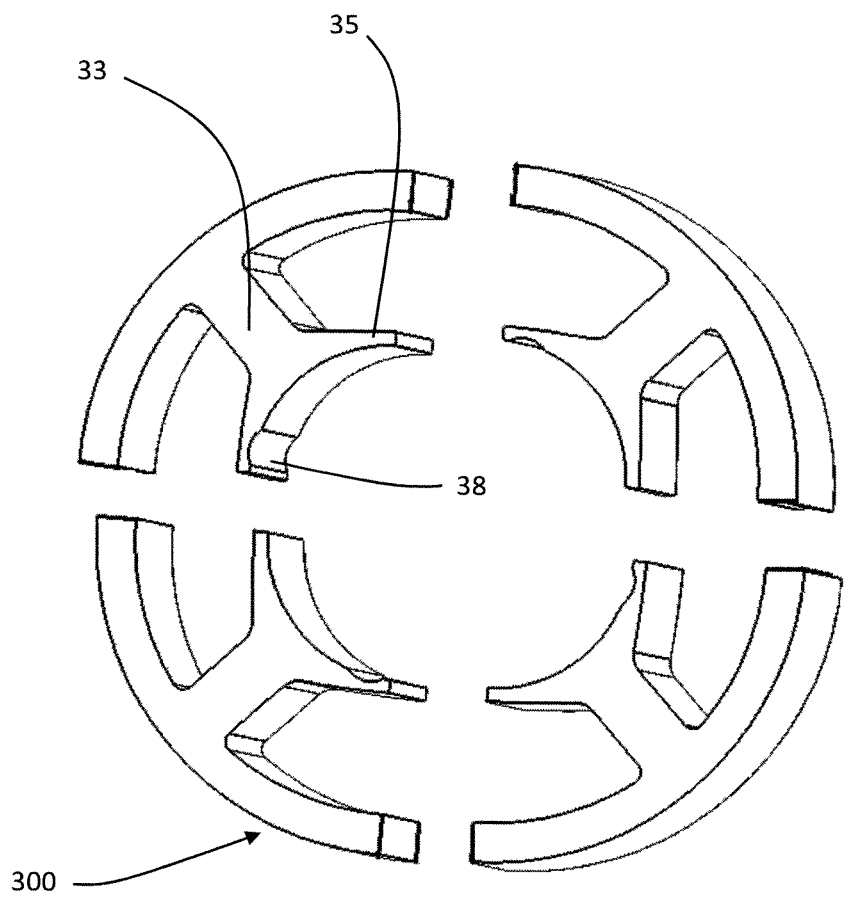
FIG. 8 illustrates a stator core of the single phase permanent magnet motor according to a third embodiment of the present invention.

Referring to FIG. 8, different from the second embodiment, plane surfaces are formed at the joining areas of the arcuate yoke segments of the adjacent stator core parts 300 of this embodiment. In this case, the joining areas of the arcuate yoke segments can be connected by soldering.

Fourth Embodiment

Figure 9:
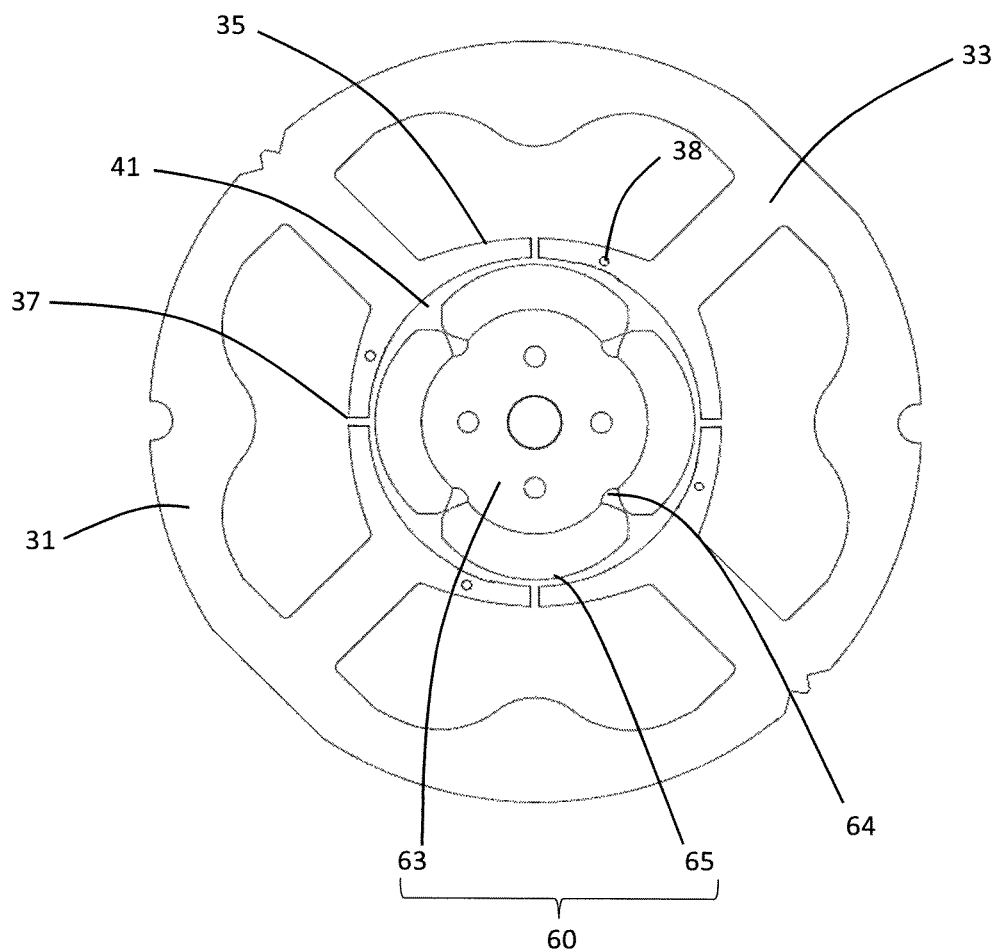
FIG. 9 is an end view of a stator core and a rotor of the single phase permanent magnet motor according to a fourth embodiment of the present invention along the axial direction of the motor.

Referring to FIG. 9, in this embodiment, the pole shoe 35 between each two adjacent tooth bodies likewise forms a positioning slot 38. Differently, the positioning slot 38 of this embodiment is disposed between the outer circumferential surface and the inner circumferential surface of the pole shoe 35 and, preferably, disposed close to the inner circumferential surface.

In this embodiment, the rotor 60 includes a plurality of permanent magnetic poles 65 arranged along a circumferential direction of the rotor. An outer circumferential surface of each permanent magnetic pole 65 is an arc surface, such that the permanent magnetic pole 65 and the inner circumferential surface of the pole shoe define a symmetrical uneven air gap 41 therebeween. Preferably, the symmetrical uneven air gap 41 has a maximum thickness that is at least 1.5 times of its minimum thickness. Each permanent magnetic pole 65 is formed by a single permanent magnet member. The permanent magnet member is mounted to an outer circumferential surface of the rotor core 63. The outer circumferential surface of the rotor core 63 is provided with a plurality of axially extending grooves 64. Each groove 64 is located at a junction between two adjacent permanent magnetic poles 65 to reduce magnetic leakage. Different from the first embodiment, the thickness of the permanent magnet member of this embodiment is uniform, and the outer circumferential surface of the rotor core 63 matches with the permanent magnet member in shape. That is, the outer circumferential surface of the rotor core 63 and the inner circumferential surface of the pole shoe are no longer located on concentric circles in the axial plan view. As such, the outer surface of the permanent magnetic pole 65 and the inner circumferential surface of the pole shoe 35 can still define the symmetrical uneven air gap 41 therebetwen because the outer surface of the permanent magnetic pole 65 is an arc surface. Alternatively, all the permanent magnetic poles 65 may be formed by a single permanent magnet member.

In the above embodiment, the slot 37 has a uniform circumferential width. It should be understood that, in an alternative embodiment, each slot 37 may also have an non-uniform width. For example, the slot 37 may be trumpet-shaped with a smaller inside and a larger outside. In this case, the width of the slot 37 refers to a minimum width of the slot 37 in this disclosure. In the above embodiment, the slot 37 extends along a radial direction of the motor. Alternatively, the slot 37 may also extend in a direction deviating from the radial direction of the motor, which can reduce the induction potential of the motor.

In the single phase permanent magnet motor provided by the present invention, the slots are defined between adjacent pole shoes, and the width of each slot is greater than zero and less than or equal to four times of the minimum thickness of the air gap, which can reduce sudden change of the magnetic reluctance caused by the slot opening, thereby reducing the cogging torque of the motor. In addition, the outer surface of the permanent magnetic pole is configured to be an arc surface, such that the thickness of the air gap progressively increases from a center of the permanent magnetic pole to two circumferential sides of the permanent magnetic pole, thus forming the symmetrical uneven air gap. This design reduces the vibration and noise produced in a conventional motor due to the unduly large slot openings, reduces or avoids the possible startup dead point, and improve the reliability of the motor startup. In addition, the startup angle and the cogging torque needed during startup of the exemplified single phase permanent magnetic motor can be easily adjusted according to design requirements, thus ensuring the reliability of the motor startup. For example, the motor startup angle can be easily adjusted by adjusting the position of the positioning slot of the pole shoe. When the startup angle Q is greater than 45 degrees electric angle and less than 135 degrees electric angle, the motor rotor can achieve bidirectional startup. The cogging torque prior to the startup of the motor can be adjusted by adjusting the shape, size and depth of the positioning slot of the pole shoe.

Fifth Embodiment

Figure 10:
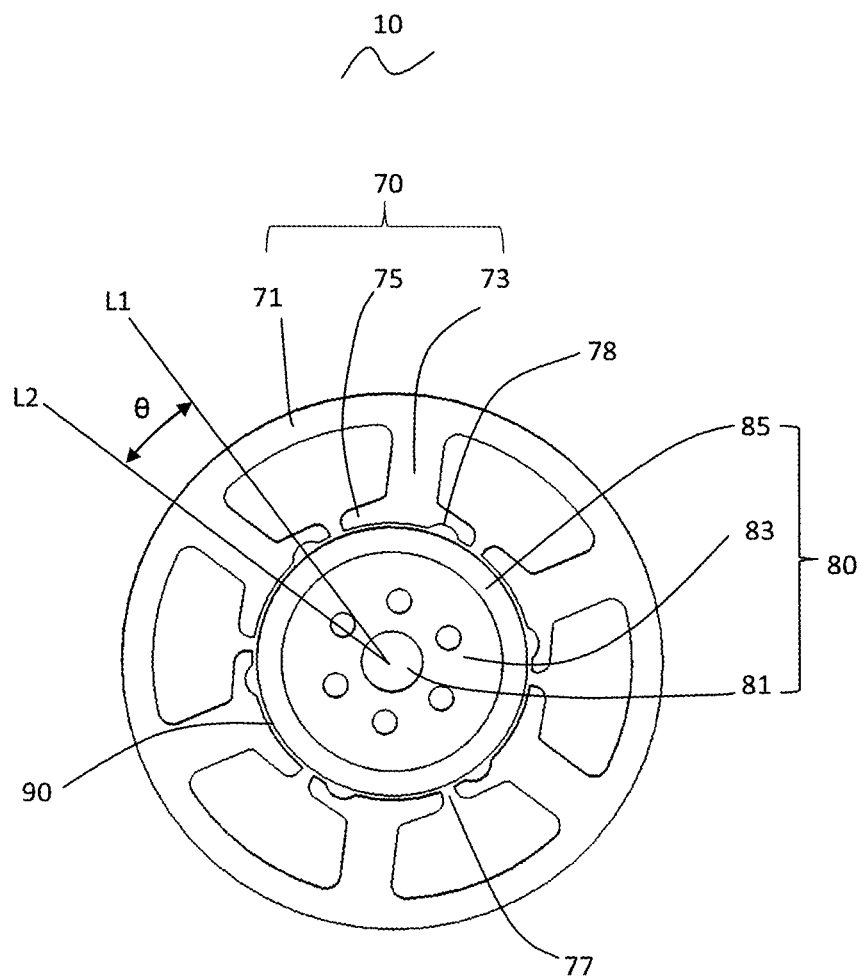
FIG. 10 is an end view of a stator core and a rotor of the single phase permanent magnet motor according to a fifth embodiment of the present invention along the axial direction of the motor.

Referring to FIG. 10, the stator core 70 of the single phase permanent magnet motor 10 of the present embodiment includes an outer ring portion 71, six tooth bodies 73 extending inwardly from the outer ring portion 71, a pole shoe 75 extending from a radial distal end to two circumferential sides of each tooth body 73. Windings are wound around the respective tooth bodies 73. A slot 77 or a magnetic bridge is formed between two adjacent pole shoes 75. The rotor 80 of the single phase permanent magnet motor is received in a space cooperatively defined by the pole shoes 75.

The rotor 80 includes a rotary shaft 81, a rotor core 83 wrapping around and fixed to the rotary shaft 81, and permanent magnetic poles 85 disposed along a circumferential direction of the rotor core 83. The permanent magnetic poles 85 are formed by a permanent magnet member mounted to an outer circumferential surface of the rotor core 83. Preferably, the permanent magnet member is a ring shaped permanent magnet member. The outer circumferential surface of the rotor core 83 matches with the ring shaped permanent magnet member in shape. The ring shaped permanent magnet member is disposed around the outer circumferential surface of the rotor core 83. The outer circumferential surface of the rotor core 83 is located on a circle centered at the center of the rotor, and is concentric with the outer circumferential surface of the ring shaped permanent magnetic poles. The permanent magnetic pole 85, which is ring shaped, and the inner circumferential surface of the pole shoe 75 bound an even air gap symmetrical about a center line of the permanent magnetic pole 85, which reduces the vibration and noise, makes the operation of the motor 10 smoother and enhances the stability of the startup.

It should be understood that, in other embodiments, the permanent magnetic poles 85 of the rotor 80 may be formed by a plurality of permanent magnet members mounted to the outer circumferential surface of the rotor core 83. In other embodiments, the outer surface of the permanent magnetic pole may be an arc surface. The outer surface of each permanent magnetic pole is spaced from a central axis of the rotor 80 by a distance that progressively decreases from a circumferential center to two circumferential sides of the outer surface. As such, the outer surface of the permanent magnetic pole and the inner circumferential surface of the pole shoe 75 define an uneven air gap therebetween that is symmetrical about a center line of the permanent magnetic pole.

In this embodiment, the inner circumferential surface of each pole shoe 75 defines a positioning slot 78 facing toward the rotor 80. Each positioning slot 78 is spaced from two adjacent tooth bodies 73 by different distances, and the positioning slot 78 is closer to one of the two adjacent tooth bodies 73. A center line L1 of the positioning slot 78 (i.e. a straight line passing through a center of the positioning slot 78 and a center of the rotor 80) is offset from a center line L2 of one adjacent tooth body 73 by an angle θ. When the angle θ between the center lines L1 and L2 is equal to 45 degrees electric angle, the output torque of the motor has an ideal torque fluctuation, and the motor vibration and noise are small. It has been found from a large number of experiments that, when the angle θ between the center lines L1 and L2 ranges between 40 degrees to 50 degrees electric angle, the output torque of the motor has an ideal torque fluctuation, and the motor vibration and noise are small.

Figure 11:
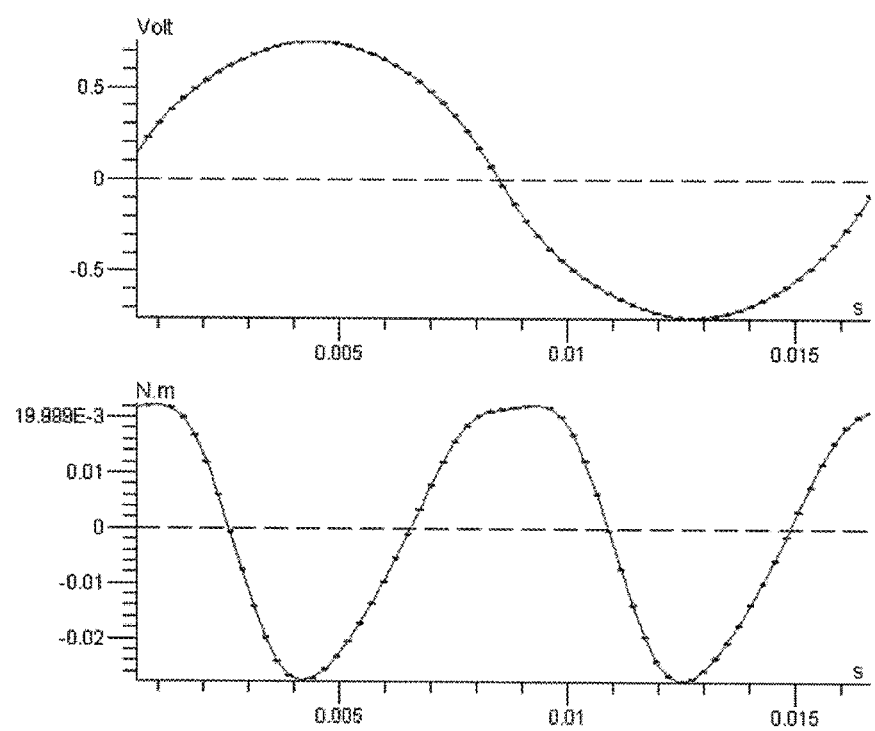
FIG. 11 is a curve diagram showing the change of the relationship between the cogging toque and the electromagnetic torque of the single phase permanent magnet motor of the present invention.
Figure 12:
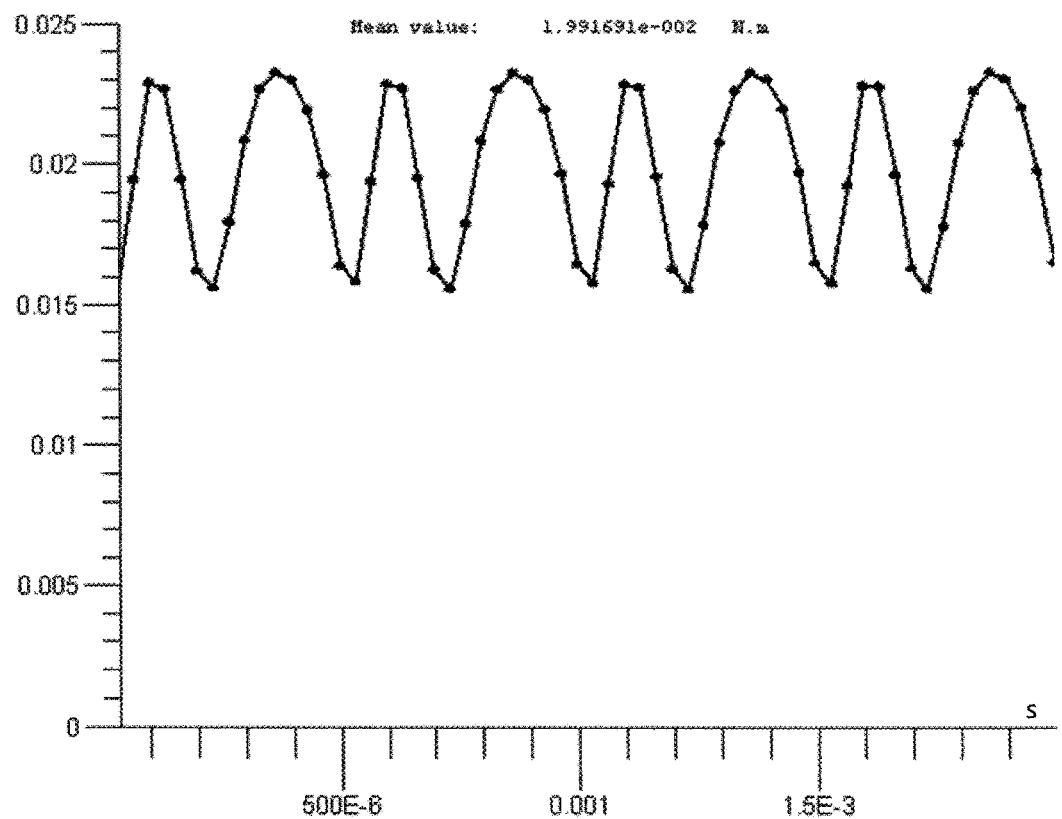
FIG. 12 is a curve diagram showing the change of the output torque of the single phase permanent magnet motor of the present invention.
Figure 13:
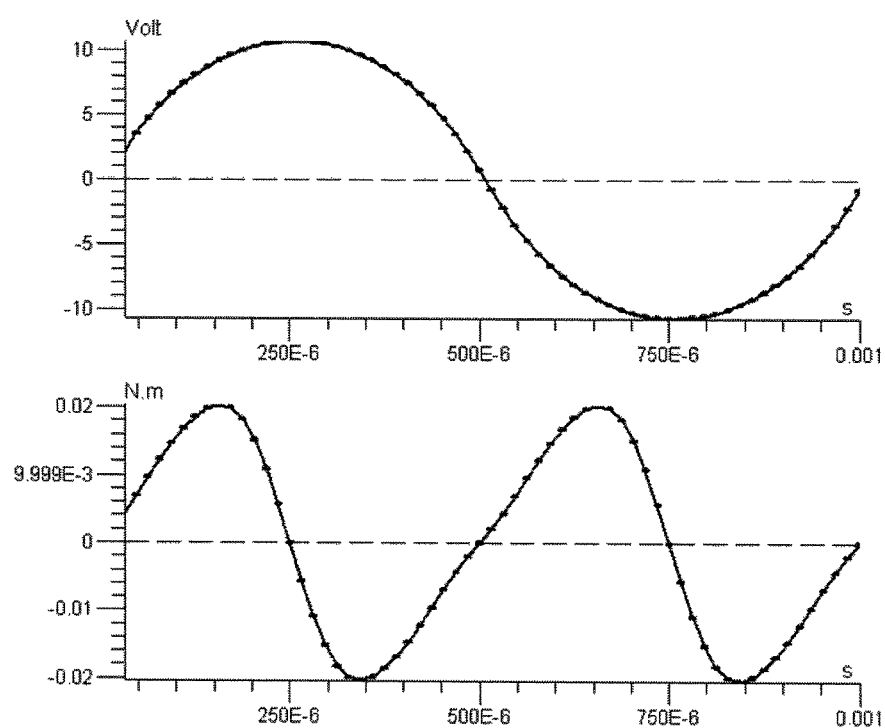
FIG. 13 is a curve diagram showing the change of the relationship between the cogging toque and the electromagnetic torque of an existing single phase permanent magnet motor.
Figure 14:
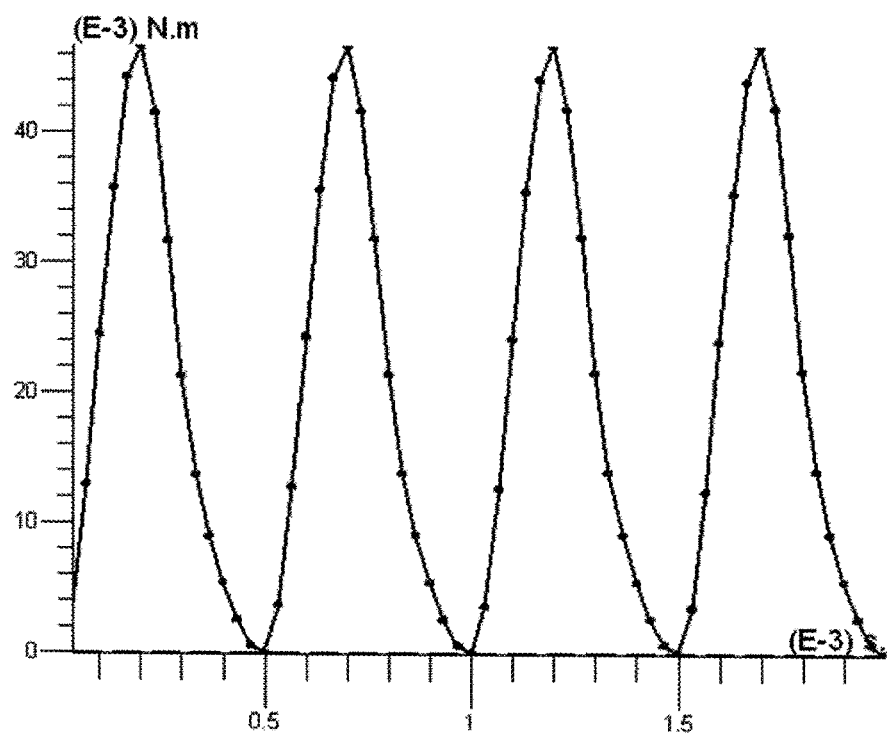
FIG. 14 is a curve diagram showing the change of the output torque of the existing single phase permanent magnet motor.

Specifically, referring to FIG. 11, the upper diagram of FIG. 11 shows the electromagnetic torque of the single phase permanent magnet motor 10 of the present invention during one electric period, where the horizontal axis represents time, the vertical axis represents the amplitude of electromagnetic torque. The lower diagram of FIG. 11 is a curve diagram showing the changing of the cogging torque of the single phase permanent magnet motor 10 of the present invention during one electric period, where the horizontal axis represents time, and the vertical axis represents cogging torque. The center line L1 of the positioning slot 38, 78 of the single phase permanent magnet motor 10 is offset from the center line L2 of the adjacent tooth body 33, 73 by the angle θ of about 45 degrees electric angle, which makes the cogging torque and the electromagnetic torque shift relative to each other by about 45 degrees electric angle. As a result, the fluctuation of the output torque synthesized from the electromagnetic torque and the cogging torque is significantly reduced. As can be seen from FIG. 12, the torque fluctuation rate=(maximal torque−minimum torque)/mean torque=(43−16)/20=35%. In various embodiments of the present invention, the torque fluctuation rate of the output torque of the single phase permanent magnet motor 10 can be less than 35% and no more than 50%. When compared between FIG. 12 and FIG. 14, it can be seen that the output torque fluctuation of the single phase permanent magnet motor of the present invention is significantly reduced when compared against the prior art. As such, the single phase permanent magnet motor of the present invention produces small torque fluctuation and, therefore, the motor vibration and noise are small.

Although the invention is described with reference to one or more preferred embodiments, it should be appreciated by those skilled in the art that various modifications are possible. Therefore, the scope of the invention is to be determined by reference to the claims that follow.

The invention claimed is:

1. A single phase permanent magnet motor comprising:
a stator comprising a stator core and windings wound around the stator core, the stator core comprising a ring portion, a plurality of tooth bodies extending radially from the ring portion, and a pole shoe extending from a distal end to two circumferential sides of each tooth body, a slot formed between each two adjacent pole shoes;
wherein each pole shoe defines a positioning slot, a center of each positioning slot is offset from a center of symmetry of one adjacent tooth body so that a torque fluctuation of an output torque of the single phase permanent magnet motor during operation is less than 50%;
wherein a rotor is rotatable relative to the stator, and the rotor has a plurality of permanent magnetic poles cooperatively with the pole shoes for forming a symmetrical uneven air gap, a width of the slot is greater than zero and less than or equal to two times of a minimum thickness of the symmetrical uneven air gap; and
wherein the rotor comprises an outer circumferential surface of a rotor core defining a plurality of axially extending grooves, the plurality of permanent magnetic poles are arranged on the outer circumferential surface of the rotor core, each groove being located at a junction between two adjacent permanent magnetic poles to reduce magnetic leakage, the plurality of axially extending grooves being arranged to face the positioning slot.

2. The single phase permanent magnet motor of claim 1, wherein the plurality of permanent magnetic poles are arranged along a circumferential direction of the rotor.

3. The single phase permanent magnet motor of claim 2, wherein the tooth bodies extend inwardly from the ring portion, the pole shoes respectively extend from inner ends of the tooth bodies, the rotor is received in a space bounded by the pole shoes, and the windings are wound around the tooth bodies.

4. The single phase permanent magnet motor of claim 3, wherein the positioning slot is defined in an inner circumferential surface of the pole shoe.

5. The single phase permanent magnet motor of claim 3, wherein an outer surface of each permanent magnetic pole is spaced from a central axis of the rotor by a distance progressively decreasing from a circumferential center to two circumferential ends of the outer surface, such that the outer surface of the permanent magnetic pole and an inner circumferential surface of the pole shoe form the symmetrical uneven air gap therebetween that is symmetrical about a center line of the permanent magnetic pole.

6. The single phase permanent magnet motor of claim 5, wherein each permanent magnetic pole is formed by one or more permanent magnet members, or all permanent magnetic poles are formed by a single ring shaped magnetic member.

7. The single phase permanent magnet motor of claim 6, wherein each permanent magnetic member is mounted to an outer circumferential surface of the rotor core.

8. The single phase permanent magnet motor of claim 7, wherein the outer circumferential surface of the rotor core and an inner circumferential surface of the permanent magnet member are located on a same cylindrical surface, and the permanent magnet member has a thickness progressively decreasing from a circumferential center to two circumferential ends of the permanent magnet member.

9. he single phase permanent magnet motor of claim 5, wherein the symmetrical uneven air gap has a maximum thickness that is at least 1.5 times of a minimum thickness of the symmetrical uneven air gap.

10. The single phase permanent magnet motor of claim 5, wherein a radial thickness of the pole shoe progressively decreases in a direction away from the tooth body.

11. The single phase permanent magnet motor of claim 3, wherein each permanent magnetic pole has a uniform thickness, and the outer circumferential surface of the rotor core matches with the permanent magnet pole in shape, the outer surface of the permanent magnetic pole and an inner circumferential surface of the pole shoe form the symmetrical uneven air gap or an even air gap therebetween.

12. The single phase permanent magnet motor of claim 1, wherein the center of each positioning slot is offset from the center of symmetry of one adjacent tooth body by 45 degrees electric angle, and the output torque of the single phase permanent magnet motor has a fluctuation rate of less than 35%.

13. The single phase permanent magnet motor of claim 1, wherein the positioning slot is defined between an outer circumferential surface and an inner circumferential surface of the pole shoe.

14. A single phase permanent magnet motor comprising:
a stator comprising a stator core and windings wound around the stator core, the stator core comprising a ring portion, a plurality of tooth bodies extending radially from the ring portion, and a pole shoe extending from a distal end to two circumferential sides of each tooth body, each pole shoe defining a positioning slot, a center of each positioning slot being offset from a center of symmetry of one adjacent tooth body by 40 to 50 degrees electric angle; and
a rotor rotatable relative to the stator, the rotor comprising a plurality of permanent magnetic poles arranged along a circumferential direction of the rotor, the permanent magnetic poles cooperatively with the pole shoes for forming a symmetrical uneven air gap, a slot is formed between each two adjacent pole shoes, a width of the slot is greater than zero and less than or equal to two times of a minimum thickness of the symmetrical uneven air gap; and
the rotor comprising a plurality of axially extending grooves defined an outer circumferential surface of a rotor core, the plurality of permanent magnetic poles are arranged on the outer circumferential surface of the rotor core, each groove being located at a junction between two adjacent permanent magnetic poles to reduce magnetic leakage, the plurality of axially extending grooves being arranged to face the positioning slot.

15. The single phase permanent magnet motor of claim 14, wherein the tooth bodies extend inwardly from the ring portion, the pole shoes respectively extend from inner ends of the tooth bodies, the rotor is received in a space bounded by the pole shoes.

16. The single phase permanent magnet motor of claim 15, wherein the center of each positioning slot is offset from the center of symmetry of one adjacent tooth body by 45 degrees electric angle, and the output torque of the single phase permanent magnet motor has a fluctuation rate of less than 35%.

17. A single phase permanent magnet motor comprising:
a stator comprising a stator core and windings wound around the stator core, the stator core comprising a ring portion, a plurality of tooth bodies extending radially from the ring portion, and a pole shoe extending from a distal end to two circumferential sides of each tooth body, a slot formed between each two adjacent pole shoes;
wherein each pole shoe defines a positioning slot, a center of each positioning slot is offset from a center of symmetry of one adjacent tooth body by an angle of 40 to 50 degrees electric angle so that a torque fluctuation of an output torque of the single phase permanent magnet motor during operation is less than 50%;
wherein a rotor is rotatable relative to the stator, and the rotor has a plurality of permanent magnetic poles cooperatively with the pole shoes for forming a symmetrical uneven air gap; and
wherein the rotor comprises an outer circumferential surface of a rotor core defining a plurality of axially extending grooves, the plurality of permanent magnetic poles are arranged on the outer circumferential surface of the rotor core, each groove being located at a junction between two adjacent permanent magnetic poles to reduce magnetic leakage, the plurality of axially extending grooves being arranged to face the positioning slot.

18. The single phase permanent magnet motor of claim 17, wherein the symmetrical uneven air gap has a maximum thickness that is at least 1.5 times of a minimum thickness of the symmetrical uneven air gap.

19. The single phase permanent magnet motor of claim 17, wherein the center of each positioning slot is offset from the center of symmetry of one adjacent tooth body by 45 degrees electric angle, and the output torque of the single phase permanent magnet motor has a fluctuation rate of less than 35%.

* * * * *